US006962682B2

(12) United States Patent
Walsdorff et al.

(10) Patent No.: US 6,962,682 B2
(45) Date of Patent: Nov. 8, 2005

(54) FIXED-BED PROCESS FOR PRODUCING CHLORINE BY CATALYTIC GAS-PHASE OXIDATION OF HYDROGEN CHLORIDE

(75) Inventors: Christian Walsdorff, Ludwigshafen (DE); Martin Fiene, Niederkirchen (DE); Christoph Adami, Weinheim (DE); Eckhard Ströfer, Mannheim (DE); Klaus Harth, Altleiningen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 134 days.

(21) Appl. No.: 10/299,725

(22) Filed: Nov. 20, 2002

(65) Prior Publication Data

US 2004/0052718 A1 Mar. 18, 2004

(30) Foreign Application Priority Data

Sep. 12, 2002 (DE) .......................................... 102 42 400

(51) Int. Cl.$^7$ ................................................ C01B 7/04
(52) U.S. Cl. ...................................... 423/502; 423/507
(58) Field of Search ................................ 423/502, 507, 423/240 R

(56) References Cited

U.S. PATENT DOCUMENTS 4,394,367 A * 7/1983 Foster ........................ 423/502
4,774,070 A * 9/1988 Itoh et al. .................... 423/502
6,387,345 B1 * 5/2002 Gestermann et al. ........ 423/502

FOREIGN PATENT DOCUMENTS

| EP | 0 233 773 | 8/1987 |
|----|-----------|--------|
| EP | 0 936 184 | 8/1999 |

* cited by examiner

Primary Examiner—Ngoc-Yen Nguyen
(74) Attorney, Agent, or Firm—Oblon, Spivak, McClelland, Maier & Neustadt, P.C.

(57) ABSTRACT

A process for preparing chlorine by catalytic gas-phase oxidation of hydrogen chloride over a fixed catalyst bed is disclosed that includes: making available a feed gas stream I with hydrogen chloride and an oxygen-containing feed gas stream II, feeding the feed gas stream I, the feed gas stream II, and, if desired, a recycled stream Ia with hydrogen chloride, an oxygen-containing recycle stream IIa, and a recycled stream III into an oxidation zone and oxidizing hydrogen chloride to chlorine in the presence of a catalyst present in a fixed bed to give product gas stream IV having chlorine, unreacted oxygen, unreacted hydrogen chloride and water vapor, and taking the recycled stream III from the product gas stream IV, without further treatment, and recirculating it to the oxidation zone, leaving a product gas stream IVa.

9 Claims, 3 Drawing Sheets

Figure 1:
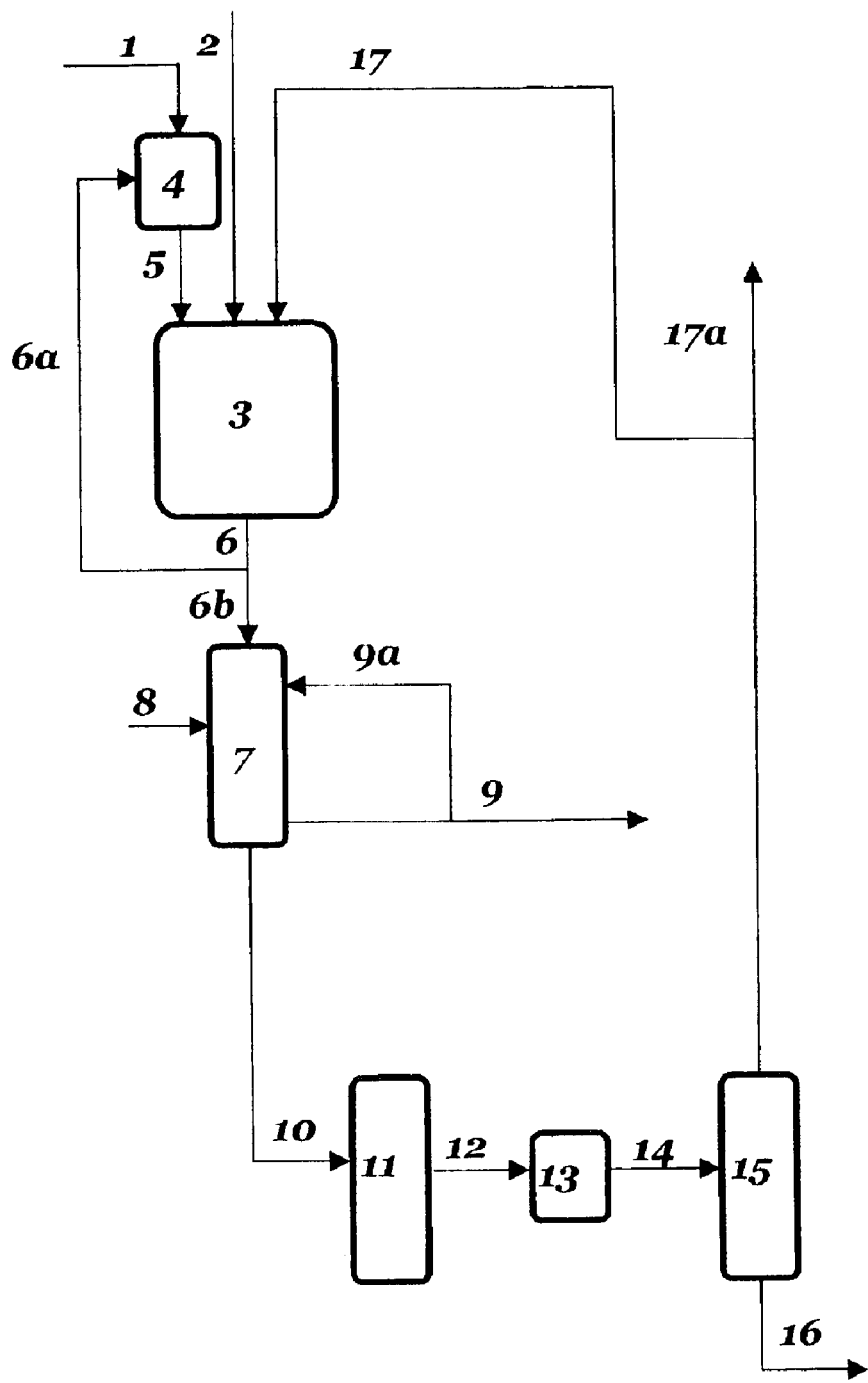

FIXED-BED PROCESS FOR PRODUCING CHLORINE BY CATALYTIC GAS-PHASE OXIDATION OF HYDROGEN CHLORIDE

The present invention relates to a fixed-bed process for preparing chlorine by catalytic gas-phase oxidation of hydrogen chloride.

In the process developed by Deacon in 1868 for the catalytic oxidation of hydrogen chloride, hydrogen chloride is oxidized to chlorine by means of oxygen in an exothermic equilibrium reaction. The conversion of hydrogen chloride into chlorine enables chlorine production to be decoupled from the production of sodium hydroxide by chloralkali electrolysis. Such decoupling is attractive since the world demand for chlorine is growing more quickly than the demand for sodium hydroxide. In addition, hydrogen chloride is obtained in large quantities as coproduct in, for example, phosgenation reactions, for example in isocyanate production. The hydrogen chloride formed in isocyanate production is mostly used in the oxychlorination of ethylene to 1,2-dichloroethane, which is further processed to vinyl chloride and then to PVC. The Deacon process thus also makes decoupling from isocyanate production and vinyl chloride production possible.

EP-B 0 233 773 describes the catalytic oxidation of hydrogen chloride over pulverulent chromium oxide catalysts in a fluidized-bed process.

Fluidized-bed processes make it possible to operate the process very isothermally. In this way, the formation of local regions of overheating in the catalyst bed, namely the formation of "hot spots", can be largely avoided. However, fluidized-bed processes have disadvantages. These include difficulties in scale-up, sometimes considerable discharge of catalyst material together with the reaction gases during operation of the fluidized-bed reactors and the instability of the fluidized bed caused by conglutination of catalyst particles.

Fixed-bed processes do not have the disadvantages mentioned. They are generally carried out using tray reactors with intermediate cooling or shell-and-tube reactors. In EP-A 0 936 184, the Deacon reaction is carried out over a fixed catalyst bed using ruthenium catalysts. However, carrying out exothermic reactions over a fixed catalyst bed generally results in the formation of hot spots.

It is an object of the present invention to provide an improved process for preparing chlorine from hydrogen chloride, which process remedies the disadvantages of the prior art.

We have found that this object is achieved by a process for preparing chlorine by catalytic gas-phase oxidation of hydrogen chloride over a fixed catalyst bed, which comprises the steps:
  a) making available a feed gas stream I comprising hydrogen chloride and an oxygen-containing feed gas stream II;
  b) feeding the feed gas stream I, the feed gas stream II, if desired a recycled stream Ia comprising hydrogen chloride, if desired an oxygen-containing recycled stream IIa and a recycled stream III into an oxidation zone and oxidizing hydrogen chloride to chlorine in the presence of a catalyst present in a fixed bed to give a product gas stream IV comprising chlorine, unreacted oxygen, unreacted hydrogen chloride and water vapor;
  c) taking the recycled stream III from the product gas stream IV and recirculating it to the oxidation zone, leaving a product gas stream IVa.

In a first process step a), a feed gas I comprising hydrogen chloride is made available. Hydrogen chloride is obtained, for example, in the preparation of aromatic polyisocyanates such as tolylene diisocyanate and diphenylmethane diisocyanate (MDI) from the corresponding polyamines and phosgene, in the preparation of acid chlorides, in the chlorination of aromatics, in the preparation of vinyl chloride and in the preparation of polycarbonates. This hydrogen chloride may contain hydrocarbons or chlorinated hydrocarbons as impurities, for example in amounts of from 100 to 3000 ppm. In addition, further gas constituents such as carbon monoxide, carbon dioxide, nitrogen and further inert gases can be present, typically in amounts of from 0 to 1% by weight.

The impurities can be removed from the feed gas stream by, for example, catalytic combustion of the hydrocarbons and chlorinated hydrocarbons in the feed gas stream or by absorption of the hydrocarbons and chlorinated hydrocarbons on a suitable absorbent.

Furthermore, a feed gas stream II comprising oxygen is made available. The feed gas stream II can consist of pure oxygen, technical-grade oxygen, for example technical-grade oxygen having an oxygen content of 94% by volume or 98% by volume, air or other oxygen/inert gas mixtures. Air is less preferred because of its high inert gas content and pure oxygen is less preferred for cost reasons.

In a process step b), at least the feed gas stream I, the feed gas stream II and a recycled stream III are fed into an oxidation zone and hydrogen chloride is oxidized to chlorine in the presence of a catalyst present in a fixed bed to give a product gas stream IV comprising chlorine, unreacted oxygen, unreacted hydrogen chloride and water vapor. The recycled stream III is taken from the product gas stream IV formed in the catalytic hydrogen chloride oxidation.

In a process step c), the recycled stream III is taken from the product gas stream IV and is recirculated to the oxidation zone, leaving a product gas stream IVa. The recycled stream III, which comprises the products of the catalytic oxidation of hydrogen chloride, viz. chlorine and water vapor, dilutes the feed gas mixture fed to the catalytic hydrogen chloride oxidation with inert constituents (chlorine and water vapor). As a result, the heat evolved in the reaction is distributed over a larger gas volume. In particular, the dilution counters the formation of hot spots. Owing to its high heat capacity, the presence of water vapor in the feed gas mixture fed to the catalytic oxidation of hydrogen chloride is particularly advantageous.

The proportion of the product gas stream IV which is recirculated is usually such that the ratio of recycled stream III to remaining product gas stream IVa is from 0.005 to 3, preferably from 0.2 to 1.5 and particularly preferably from 0.4 to 1.

The recirculation of the recycled stream III can be carried out by means of a compressor. If the pressure drop over the fixed catalyst bed is low, the use of a blower can also be sufficient. If feed gas stream I, II and/or recycled stream IIa are under superatmospheric pressure, for example >5 bar, recirculation can be carried out using a jet nozzle by means of which the recycled stream III is drawn in by one or more of the gas streams I, II and IIa. The recycled stream III can thus be made up of a plurality of streams.

Preference is given to a process in which the feed gas stream II comprises technical-grade oxygen which has been obtained by liquefaction of air and is thus under a high intrinsic pressure and the recycled stream III is drawn in by the feed gas stream II by means of a jet nozzle. The technical-grade oxygen obtained by liquefaction of air can be under an intrinsic pressure of 30 bar or more.

In the catalytic process also known as the Deacon process, hydrogen chloride is oxidized to chlorine by means of oxygen in an exothermic equilibrium reaction which also forms water vapor. Customary reaction temperatures range from 150 to 500° C., and customary reaction pressures are from 1 to 25 bar. Since the reaction is an equilibrium reaction, it is advantageous to carry it out at the lowest possible temperatures at which the catalyst still has a satisfactory activity. Furthermore, it is advantageous to use oxygen in superstoichiometric amounts. It is usual, for example, to use a two- to four-fold excess of oxygen. Since no decreases in selectivity are to be feared, it can be economically advantageous to work at relatively high pressures and accordingly longer residence times than at atmospheric pressure.

Suitable catalysts comprise ruthenium oxide, ruthenium chloride or other ruthenium compounds on silicon dioxide, aluminum oxide, titanium dioxide or zirconium dioxide as support. Suitable catalysts can be obtained, for example, by application of ruthenium chloride to the support and subsequent drying or drying and calcination. Suitable catalysts may comprise, in addition to or instead of a ruthenium compound, compounds of other noble metals, for example gold, palladium, platinum, osmium, iridium, silver, copper or rhenium. Suitable catalysts may also comprise chromium (III) oxide.

According to the process of the present invention, the catalytic oxidation of hydrogen chloride is carried out in one or more fixed-bed reactors. The hydrogen chloride oxidation can be carried out in a plurality of stages.

The catalytic oxidation of hydrogen chloride can be carried out adiabatically or preferably isothermally or approximately isothermally, batchwise or preferably continuously as a fixed-bed process, preferably in shell-and-tube reactors, over heterogeneous catalysts at reactor temperatures of from 180 to 500° C., preferably from 200 to 400° C., particularly preferably from 220 to 350° C., and a pressure of from 1 to 25 bar, preferably from 1.2 to 20 bar, particularly preferably from 1.5 to 17 bar and in particular from 2.0 to 15 bar.

In an isothermal or approximately isothermal process, it is also possible for from 2 to 10, preferably from 2 to 6, particularly preferably from 2 to 5, in particular 2 or 3, reactors connected in series with additional intermediate cooling to be used. The oxygen can either all be introduced together with the hydrogen chloride upstream of the first reactor or can be added at points distributed over the various reactors. This series arrangement of individual reactors can also be combined in one apparatus.

In a preferred embodiment, a structured catalyst bed in which the catalyst activity increases in the flow direction is used. Such structuring of the catalyst bed can be achieved by differing impregnation of the catalyst supports with active composition or by differing dilution of the catalyst with an inert material. As inert material, it is possible to use, for example, rings, cylinders or spheres made of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Suitable shaped catalyst bodies include any shapes; preference is given to pellets, rings, cylinders, stars, wagon wheels or spheres, particularly preferably rings, cylinders or star extrudates.

Suitable heterogeneous catalysts are, in particular, ruthenium compounds or copper compounds on support materials, which may also be doped; preference is given to doped or undoped ruthenium catalysts. Suitable support materials are, for example silicon dioxide, graphite, titanium dioxide having a rutile or anatase structure, zirconium dioxide, aluminum oxide or mixtures thereof, preferably titanium dioxide, zirconium dioxide, aluminum oxide or mixtures thereof, particularly preferably γ- or δ-aluminum oxide or mixtures thereof.

The supported copper catalysts or supported ruthenium catalysts can, for example, be obtained by impregnation of the support material with aqueous solutions of $CuCl_2$ or $RuCl_3$ and, if desired, a promoter for doping, preferably in the form of their chlorides. Shaping of the catalyst can be carried out after or preferably before impregnation of the support material.

Promoters suitable for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The shaped bodies can subsequently be dried and if appropriate calcined at temperatures of from 100 to 400° C., preferably from 100 to 300° C., for example under a nitrogen, argon or air atmosphere. The shaped bodies are preferably firstly dried at from 100 to 150° C. and subsequently calcined at from 200 to 400° C.

The conversion of hydrogen chloride in a single pass can be limited to from 15 to 95%, preferably from 40 to 90%. Unreacted hydrogen chloride can be separated off and partly or wholly returned to the catalytic hydrogen chloride oxidation. The volume ratio of hydrogen chloride to oxygen at the inlet to the reactor is generally from 1:1 to 20:1, preferably from 2:1 to 8:1, particularly preferably from 2:1 to 5:1.

The process of the present invention preferably comprises further process steps involving fractionation of the product gas mixture and purification of the individual components. It is usual to carry out the additional steps d) to g):

d) separating off hydrogen chloride and water from the product gas stream IVa;

e) drying the gas stream V;

f) separating off an oxygen-containing stream from the gas stream V and, if desired, recirculating at least part of it as oxygen-containing recycled stream IIa to the oxidation zone, leaving a chlorine-containing product stream VI;

g) if appropriate, further purifying the chlorine-containing product stream VI.

In a process step d), unreacted hydrogen chloride and water vapor are separated off from the product gas stream IVa. This can be achieved by condensing aqueous hydrochloric acid from the product gas stream IVa by cooling. Hydrogen chloride can also be absorbed in dilute hydrochloric acid or water.

In one embodiment of the invention, the separation step d) is carried out as described below. In a process step d1), the product gas stream IVa is brought into contact with dilute hydrochloric acid having a concentration of c1 in an absorption zone and hydrogen chloride is absorbed in the dilute hydrochloric acid, giving a hydrochloric acid having a concentration of c2 and a gas stream V comprising chlorine and oxygen. In a process step d2), the absorbed hydrogen chloride is liberated again from the hydrochloric acid having a concentration of c2 in a desorption zone. The hydrogen chloride which has been liberated can be recirculated at least partly, preferably completely, as recycled stream Ia comprising hydrogen chloride to the oxidation zone where further chlorine is obtained from the recirculated hydrogen chloride. A dilute hydrochloric acid having a concentration of c1 is recovered as absorption medium and is at least partly recirculated to the absorption zone.

As absorption medium, it is possible to use any dilute hydrochloric acid which is not saturated with hydrogen chloride. Its concentration c3 will usually be up to 25% by weight of hydrogen chloride, for example about 15% by weight. The absorption temperature is usually from 0 to 150° C., preferably from 30 to 100° C., and the absorption pressure is usually from 0.5 to 20 bar, preferably from 1 to 10 bar. The desorption is preferably carried out in a desorption column having from 3 to 10 theoretical plates. The desorption pressure is usually from 0.3 to 10 bar, preferably from 0.5 to 5 bar.

This gives a gas stream V which comprises chlorine and oxygen or consists essentially of these gases. It usually still contains traces of moisture. It is therefore usually subjected to a drying step e) in which the gas stream V is freed of traces of moisture by bringing it into contact with suitable desiccants. Suitable desiccants are, for example, concentrated sulfuric acid, molecular sieves or hygroscopic adsorbents.

In a process step f), an oxygen-containing stream is separated off from the gas stream V and can be at least partly recirculated as oxygen-containing recycled stream IIa to the oxidation zone. The oxygen is preferably separated off by distillation, usually at a temperature in the range from −20 to +50° C. and a pressure in the range from 1 to 20 bar in a distillation column having from 10 to 100 theoretical plates. The oxygen-containing recycled stream IIa is frequently under a high pressure.

This leaves a chlorine-containing product stream VI which may subsequently be purified further.

The invention is illustrated below with the aid of the figures.

FIG. 1 shows the process flow diagram of one embodiment of the process of the present invention.

An oxygen-containing feed gas stream 1, a feed stream 2 comprising hydrogen chloride, an oxygen-containing recycle stream 17 and a recycle stream 6a comprising products of the hydrogen chloride oxidation are fed into the hydrogen chloride oxidation reactor 3 in which hydrogen chloride is catalytically oxidized to chlorine. The recycle stream 6a is drawn in by the oxygen-containing stream 1 by means of the jet nozzle 4 and the two are jointly fed into the reactor 3 as gas stream 5. The feed gas stream 1 used is, for example, oxygen having a concentration of 94% by volume which is obtained from a pressure swing absorption (technical-grade oxygen) or oxygen obtained by liquefaction of air. This is under a high pressure, for example 30 bar. A product gas stream 6 comprising chlorine, unreacted oxygen, unreacted hydrogen chloride and water vapor is obtained. The product gas stream 6 is divided into the recycled stream 6a and the product gas stream 6b for further processing. The product gas stream 6b is introduced into a quench cooler 7 to condense out hydrochloric acid 9. If desired, water 8 can be fed into the quench cooler as quenching medium and a substream 9a of the dilute hydrochloric acid can be recirculated to the quench cooler as quenching medium. A stream 10 which is essentially free of hydrogen chloride and comprises chlorine, oxygen and water vapor leaves the quench cooler 7 and is passed to a drying stage 11. In the drying stage 11, the gas stream 10 is brought into contact with a suitable absorbent such as sulfuric acid, molecular sieves or another hygroscopic adsorbent and is thus freed of traces of water. A demister 13 is optionally installed downstream of the drying stage 11 to free the dried gas stream 12 of entrained liquid particles. A demister is preferably provided if the drying stage 11 comprises an absorption over sulfuric acid. The gas stream 14 which has been dried and, if appropriate, freed of liquid particles and comprises chlorine and oxygen is fed to the distillation stage 15 in which oxygen is separated off and is recirculated as recycle stream 17 to the hydrogen chloride oxidation reactor. A product stream 16 comprising chlorine is obtained. To avoid accumulation of inert gas constituents such as nitrogen, argon (possibly from the oxygen-containing feed stream 4, if pure oxygen was not used), a purge stream 17a is provided.

Figure 2:
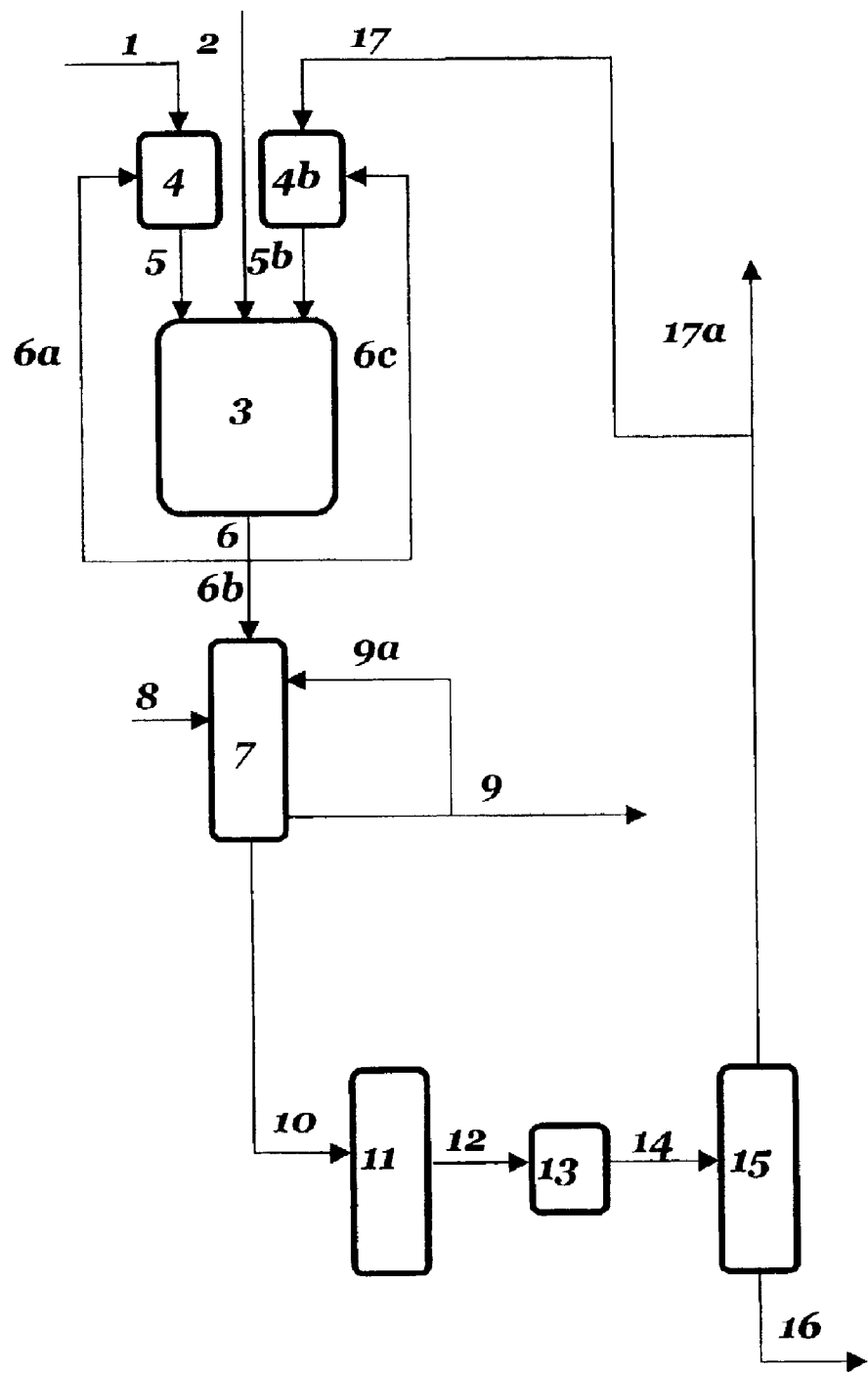

FIG. 2 shows a variant of the process outlined in FIG. 1, in which the oxygen-containing recycle stream 17 is used to draw in a further recycle stream 6c by means of a second jet nozzle 4b.

Figure 3:
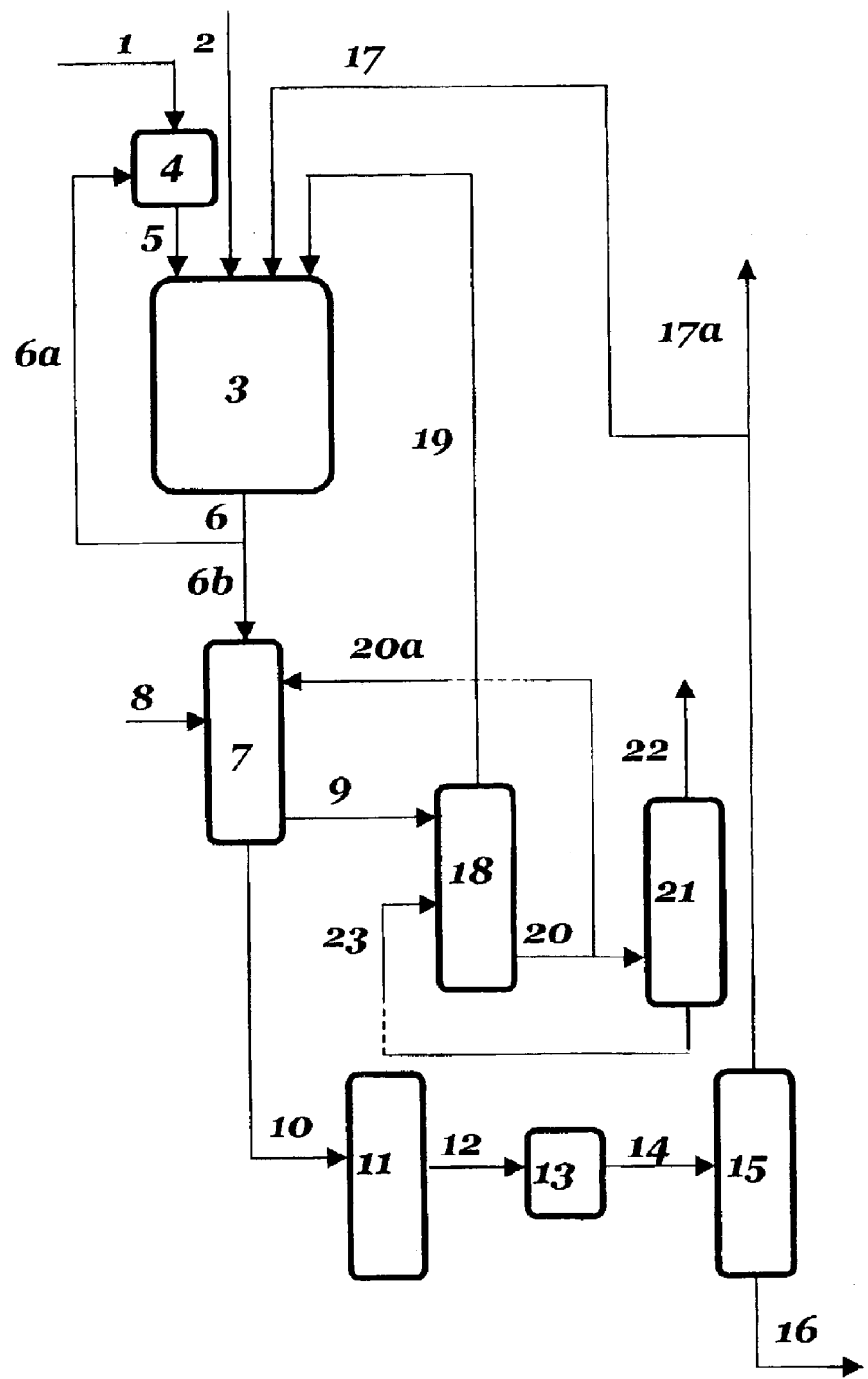

FIG. 3 shows a further variant of the process outlined in FIG. 1. Here, the product gas stream 6b is introduced into a phase contact apparatus 7 and there brought into contact with dilute hydrochloric acid 20a and, if desired, water. The stream 9 which is laden with the hydrogen chloride which has been separated off and comprises hydrochloric acid having a higher concentration is fed to the desorption column 18 in which the absorbed hydrogen chloride is liberated again and is fed as recycle stream 19 to the hydrogen chloride oxidation reactor 5. The dilute hydrochloric acid 20 obtained in the desorption is partly recirculated to the phase contact apparatus 7 and partly fed to a distillation column 21. There it is distilled under reduced pressure in order to break the azeotrope. This gives water 22 and concentrated hydrochloric acid 23 which is recirculated to the desorption column 18 in order to liberate further hydrogen chloride.

We claim:

1. A process for preparing chlorine by catalytic gas-phase oxidation of hydrogen chloride over a fixed catalyst bed, the process comprising:

making available a feed gas stream I comprising hydrogen chloride and an oxygen feed gas stream II;

feeding the feed gas I, the feed gas stream II, and, if desired, a recycled stream Ia comprising hydrogen chloride, and an oxygen-containing recycled stream IIa into an oxidation zone;

oxidizing hydrogen chloride to chlorine in the presence of a catalyst present in a fixed bed in the oxidation zone to give a product gas stream IV comprising chlorine, unreacted oxygen, unreacted hydrogen chloride and water vapor; and taking a recycled stream III comprising chlorine and water vapor from the product gas stream IV and recirculating said recycled stream III to the oxidation zone, leaving a product gas stream IVa.

2. The process as claimed in claim 1, wherein the ratio of the streams III/IVa is from 0.005 to 3.

3. The process as claimed in claim 2, wherein the ratio is from 0.2 to 1.5.

4. The process as claimed in claim 3, wherein the ratio is from 0.4 to 1.

5. The process as claimed in claim 1, wherein the recycle stream III is drawn in by one or more of the gas streams I, II and, if applicable, IIa by means of a jet nozzle.

6. The process as claimed in claim 5, wherein the recycle stream III is drawn in by the feed stream II.

7. The process as claimed in claim 6, wherein the feed gas stream II comprises technical-grade oxygen which is obtained by liquefaction of air and is thus under a high intrinsic pressure.

8. The process as claimed in claim 1, further comprising:

separating off hydrogen chloride and water from the product gas stream IVa to give a gas stream V;

drying the gas stream V;

separating off an oxygen-containing stream from the gas stream V and, if desired, recirculating at least part of it as oxygen-containing recycled stream IIa to the oxidation zone, leaving a chlorine-containing product stream VI; and if appropriate, further purifying the chlorine-containing product stream VI.

9. The process as claimed in claim 1, wherein the catalyst comprises ruthenium oxide on a support selected from among silicon dioxide, aluminum oxide, titanium dioxide and zirconium dioxide.

* * * * *